US009843362B2

(12) United States Patent
Suzuki et al.

(10) Patent No.: US 9,843,362 B2
(45) Date of Patent: Dec. 12, 2017

(54) INFORMATION PROCESSING SYSTEM, INFORMATION PROCESSING DEVICE AND METHOD

(71) Applicant: NINTENDO CO., LTD., Kyoto (JP)

(72) Inventors: Kazuhiro Suzuki, Kyoto (JP); Yasuyuki Shimohata, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 15/254,406

(22) Filed: Sep. 1, 2016

(65) Prior Publication Data
US 2017/0104514 A1    Apr. 13, 2017

(30) Foreign Application Priority Data
Oct. 8, 2015 (JP) .............................. 2015-200191

(51) Int. Cl.
| | |
|---|---|
| *G05B 11/01* | (2006.01) |
| *H04B 5/00* | (2006.01) |
| *G08C 17/02* | (2006.01) |
| *H01Q 1/22* | (2006.01) |

(52) U.S. Cl.
CPC ........... *H04B 5/0056* (2013.01); *G08C 17/02* (2013.01); *H01Q 1/2208* (2013.01)

(58) Field of Classification Search
CPC ..... G07C 9/00309; G08C 17/02; G08C 19/28
USPC ........... 340/12.51, 13.26; 463/36, 37, 42, 47
See application file for complete search history.

(56) References Cited

U.S. PATENT DOCUMENTS

| | | | | |
|---|---|---|---|---|
| 5,659,888 | A | * | 8/1997 | Kato ...................... H01Q 1/242 455/575.7 |
| 7,071,892 | B2 | * | 7/2006 | Astrin ...................... H01Q 1/50 343/718 |
| 8,446,256 | B2 | * | 5/2013 | Pinkham .............. G06K 7/0008 340/10.1 |
| 2011/0136446 | A1 | * | 6/2011 | Komninakis ........ H04B 7/0691 455/78 |
| 2013/0324262 | A1 | | 12/2013 | Shimohata et al. |
| 2015/0303569 | A1 | * | 10/2015 | Jacobs ..................... H01Q 1/28 343/858 |
| 2015/0304431 | A1 | * | 10/2015 | Honorato Garcia .... G06F 1/266 709/228 |

FOREIGN PATENT DOCUMENTS

JP    2013-251816    12/2013

* cited by examiner

*Primary Examiner* — Carlos E Garcia
(74) *Attorney, Agent, or Firm* — Nixon & Vanderhye PC

(57) ABSTRACT

An information processing device includes: a communication control unit which performs short-range wireless communication with an IC tag; a base antenna; and a terminal to which an extension antenna device can be connected, the extension antenna device includes: extension antennas; and a terminal which, by being connected to the terminal to which an extension antenna device can be connected, connects the extension antennas and the information processing device to each other, and the communication control unit performs the short-range wireless communication with the IC tag via at least any of the base antenna 19 and the extension antennas.

15 Claims, 3 Drawing Sheets

INFORMATION PROCESSING SYSTEM, INFORMATION PROCESSING DEVICE AND METHOD

CROSS-REFERENCE TO RELATED APPLICATION

This application is based upon and claims the benefit of priority of the prior Japanese Patent Application No. JP2015-200191, filed on Oct. 8, 2015, the entire contents of which are incorporated herein by reference.

FIELD

The present disclosure relates to information processing using short-range wireless communication.

BACKGROUND AND SUMMARY

Conventionally, information processing devices including a reader/writer for short-range wireless communication such as near field communication (NFC) are widely used. The reader/writer is used to detect an IC tag and acquire data in the IC tag to be utilized in information processing by the information processing device.

However, such a reader/writer for short-range wireless communication communicates via a built-in antenna. Therefore, the only way to utilize a reader/writer in various information processing tasks is to use an antenna configuration fixed in advance to the reader/writer regardless of characteristics of each information processing task. For example, when information processing by the information processing device is game processing, there is no choice but to use the antenna configuration fixed in advance despite systems and world views of games being different from one game to another. Therefore, conventionally, a dedicated reader/writer is provided for each information processing task or each game processing task in which a reader/writer is used.

An aspect of the present disclosure is an information processing system comprising an information processing device and an extension antenna device connected to the information processing device, wherein the information processing device includes: a communication control unit which performs short-range wireless communication with a communicator having a short-range wireless communication function; a base antenna which is used for the short-range wireless communication; and an information processing device-side terminal which is configured to be connected with the extension antenna device, the extension antenna device includes: an extension antenna which is used for the short-range wireless communication; and an extension antenna-side terminal which, by being connected to the information processing device-side terminal, connects the extension antenna and the information processing device to each other, and the communication control unit performs the short-range wireless communication with the communicator via at least one of the base antenna and the extension antenna.

In addition, the present disclosure can also be comprehended as an information processing device, a method that is executed by a computer, and a program to be executed by a computer. Furthermore, the present disclosure can also be comprehended as a recording of such a program on a recording medium that is readable by a device such as a computer, a machine, or the like. In this case, a recording medium that is readable by a computer or the like refers to a recording medium which stores information such as data and programs by an electric action, a magnetic action, an optical action, a mechanical action, or a chemical action and which can be read by a computer or the like.

DETAILED DESCRIPTION OF NON-LIMITING EXAMPLE EMBODIMENTS

Hereinafter, embodiments of the present disclosure will be described with reference to the drawings. It should be noted that the embodiments described below merely represent examples of implementing the present disclosure and are not intended to limit the present disclosure to the specific configurations described below. When implementing the present disclosure, a specific configuration may be adopted as appropriate in accordance with each embodiment.

First Embodiment

Figure 1:
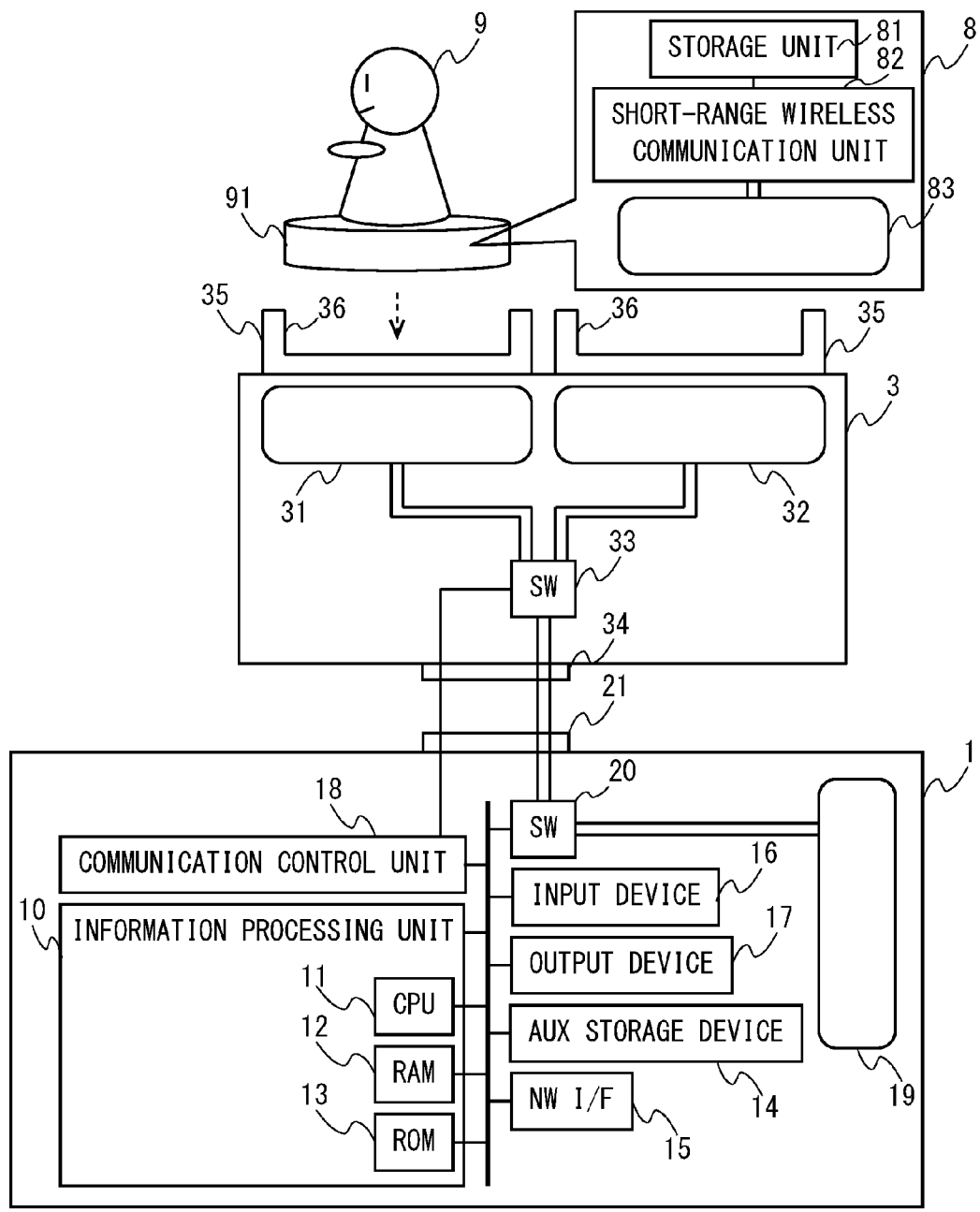
FIG. 1 is a diagram showing an outline of a configuration and an outline of a hardware configuration of an information processing system according to a first embodiment.

FIG. 1 is a diagram showing an outline of a configuration and an outline of a hardware configuration of an information processing system according to the present embodiment. The information processing system according to the present embodiment includes an information processing device 1 and an extension antenna device 3 connected to the information processing device 1.

The information processing device 1 according to the present embodiment is a game device or the like used by a user. Devices of various types can be used as a game device including a stationary game device and a portable game device, and a specific type thereof is not limited. The user can play a game by having the information processing device 1 execute game processing based on a game program. However, the present disclosure can be widely applied to information processing in which short-range wireless communication is used and, accordingly, information processing devices to which the present disclosure is applied are not limited to game devices. Examples of other information processing devices to which the present disclosure is applied include a smart phone, a tablet, a personal computer, and a wearable electronic device. Moreover, information processing to which the present disclosure is applicable is not limited to game processing.

In addition, the information processing device 1 according to the present embodiment can communicate with an IC tag (a communicator) 8 by short-range wireless communication (for example, NFC) in game processing. In this case, short-range wireless communication refers to near-field wireless communication which has a communication area with an extremely short distance of about 1 meter or less and which enables non-contact communication. While there are various communication standards for short-range wireless communication, communication standards adoptable for short-range wireless communication according to the present disclosure are not limited. In order to construct a world view of a game, the IC tag 8 can be built into a game component 9 which may be an object of appreciation such as a figure and a card. In the present embodiment, an example in which the IC tag 8 is built into the game component 9 that is a figure will be described.

The game component 9 is a figure, a card, or the like featuring a character or the like which appears in the game and is available in a plurality of types. Every game component 9 has a built-in IC tag 8 and further includes a member with a prescribed shape and size. For example, every figure according to the present embodiment includes a member 91 that is a cylindrically-shaped pedestal with a same diameter. In addition, when the game component 9 is a card, a card member that is an outer shell into which the IC tag 8 is built in every card has vertical and horizontal lengths of a unified standard.

Furthermore, the IC tag 8 includes a storage unit 81 in which data is recorded, a short-range wireless communication unit 82 which reads data from the storage unit 81 and transmits the data, and an IC tag antenna 83 used for short-range wireless communication. Since recorded data differs for each game component 9, data included in contents of short-range wireless communication received by the information processing device 1 from the IC tag 8 differs for each game component 9.

The information processing device 1 is an information processing device to which are electrically connected a central processing unit (CPU) 11, a random access memory (RAM) 12, a read only memory (ROM) 13, an auxiliary storage device 14, a network interface 15 for communicating with the outside via a network, an input device 16 for receiving user operations, an output device 17 for visual output and audio output, a communication control unit (an NFC IC) 18, abase antenna 19 to be used for short-range wireless communication, a switching unit (a switch IC) 20, and an information processing device-side terminal 21 to which the extension antenna device 3 can be connected. Moreover, components may be omitted, replaced, and added as appropriate in the specific hardware configuration of the information processing device 1 in accordance with embodiments.

The CPU 11 is a central processing unit and controls the respective components of the information processing device 1 including the RAM 12 and the auxiliary storage device 14 by processing commands and data deployed on the RAM 12, the ROM 13, and the like. In addition, the RAM 12 is a primary storage device controlled by the CPU 11, and various commands and data are written in and read from the RAM 12. In other words, the CPU 11, the RAM 12, and the ROM 13 constitute an information processing unit 10 of the information processing device 1.

The auxiliary storage device 14 is a non-volatile storage device. Information that is desirably retained even after shutting down the information processing device 1 including an operating system (OS) of the information processing device 1 that is loaded onto the RAM 12, various programs for executing the processing described later, and various data to be used by the information processing device 1 are mainly written in and read from the auxiliary storage device 14. For example, an electrically erasable programmable ROM (EEPROM) or a hard disk drive (HDD) can be used as the auxiliary storage device 14. Alternatively, a portable medium that is attachably and detachably mounted to the information processing device 1 may be used as the auxiliary storage device 14. Examples of a portable medium include a memory card constituted by an EEPROM or the like, a Compact Disc (CD), a Digital Versatile Disc (DVD), and a Blu-ray (registered trademark) Disc (BD). An auxiliary storage device 14 using a portable medium and a non-portable auxiliary storage device 14 can also be used in combination.

As the input device 16, various devices can be adopted including a button, a lever, a keyboard, a microphone, a camera, an acceleration sensor, an angular velocity sensor, a touch panel, and a touch panel display. A touch panel display is a type of the input device 16 of the information processing device 1 which doubles as the output device 17 for outputting images. By touching a surface of the touch panel display with a stylus, a finger, or the like, the user can input handwriting. For example, a resistive film touch panel or a capacitive touch panel may be adopted as the touch panel display. In addition, a touch panel with an arbitrary system can be used as the touch panel display.

The switching unit 20 is controlled by the communication control unit 18 or the information processing unit 10 and switches a signal sent to the communication control unit 18 between a signal from the base antenna 19 and a signal from the extension antenna device 3.

By transmitting and receiving signals to and from the IC tag 8 in accordance with a prescribed protocol for short-range wireless communication, the communication control unit 18 performs short-range wireless communication with the IC tag 8 and receives date from the IC tag 8 or transmits data to the IC tag 8. In this case, by controlling switching of antennas by the switching unit 20, the communication control unit 18 performs short-range wireless communication with the IC tag 8 via at least any of the base antenna 19 and an extension antenna. Moreover, in the present embodiment, since the extension antenna device 3 includes a first extension antenna 31 and a second extension antenna 32, by controlling the switching unit 20 and an extension switching unit 33, the communication control unit 18 switches a signal sent to the communication control unit 18 among a signal from the base antenna 19, a signal from the first extension antenna 31, and a signal from the second extension antenna 32.

The information processing unit 10 performs game processing by loading a game program desired by the user to the RAM 12 by a method such as reading the game program from the auxiliary storage device 14 or downloading the game program via a network, and executing the game program. A state of the game such as progress is managed using data (flags, parameters, and the like) in the game program and the like. For example, in the present embodiment, the information processing unit 10 performs game processing by executing the game program in accordance with contents of short-range wireless communication received by the communication control unit 18 from the IC tag 8 and contents of a user operation received by the input device 16 while reflecting the contents in various flags and parameters of the game program.

In addition, the information processing unit 10 may determine from which antenna data to be used for the game processing is obtained in accordance with an application (for example, the game program) being executed, contents of the user operation, contents of short-range wireless communication, game progress, and flags and parameters in the game. In doing so, the information processing unit 10 may obtain data from all IC tags 8 capable of short-range wireless communication and select data obtained via a desired antenna in the obtained data. Alternatively, the information processing unit 10 may instruct the communication control unit 18, the switching unit 20, or the extension switching unit 33 so that data is obtained via a desired antenna. In this case, the communication control unit 18 receives an instruction from the information processing unit 10 and determines which antenna is to be used to obtain data in accordance with contents of a user operation received by the input device 16.

In addition, the extension antenna device 3 includes the first extension antenna 31 and the second extension antenna 32 which are used for short-range wireless communication, the extension switching unit (a switch IC) 33 which is used for switching extension antennas, an extension antenna-side terminal 34 which connects the extension antennas 31 and 32 with the information processing device 1 by being connected to the information processing device-side terminal 21, and a fixing unit 35 which fixes a figure including the IC tag 8. The extension antenna device 3 according to the present embodiment does not include a processor such as a CPU, a RAM, and a ROM. In addition, since short-range wireless communication is controlled by the communication control unit 18 of the information processing device 1, the extension antenna device 3 according to the present embodiment need not include an IC for performing short-range wireless communication (which corresponds the communication control unit 18 included in the information processing device 1). However, components may be omitted, replaced, and added as appropriate in the specific hardware configuration of the extension antenna device 3 in accordance with embodiments in a similar manner to the information processing device 1.

Furthermore, an outer shape of the extension antenna device 3 and an arrangement of the extension antennas 31 and 32 according to the present embodiment are determined so as to conform to characteristics of information processing (in the case of game processing, a system and a word view of the game) in which the extension antenna device 3 is used.

In this case, the extension antenna may have a different size from the base antenna 19. Accordingly, an extension antenna with a different short-range wireless communication-enabled range from the base antenna can be provided and a scope of information processing can be expanded. For example, by providing a relatively large extension antenna, a plurality of IC tags can be arranged so as to be capable of communication with respect to one antenna and the extension antenna device can be used as a wireless portal for displaying a plurality of installed game components.

In addition, while a case where two extension antennas are provided is described in the present embodiment, the number of extension antennas is not limited to two. There may be only one extension antenna or three or more extension antennas. For example, when the extension antenna device includes three or more extension antennas and uses a card-type game component 9, the extension antenna device can be used as a deck for a card game on which a plurality of cards can be arranged side by side.

The extension switching unit 33 is controlled by the communication control unit 18 or the information processing unit 10 and switches a signal sent to the communication control unit 18 of the information processing device 1 between a signal from the first extension antenna 31 and a signal from the second extension antenna 32.

The fixing unit 35 includes a fitting section 36 to which the member 91 of a figure fits in (for example, fits by insertion or interdigitation) a vicinity of the extension antennas 31 and 32 and fixes the IC tag 8 in a range in which short-range wireless communication can be performed using the extension antennas 31 and 32. As the game component 9 is fixed at a prescribed position by the fixing unit 35 and the IC tag 8 is fixed in a range in which short-range wireless communication can be performed, the user can enjoy the world view of the game and a situation can be avoided where detaching of the IC tag 8 during game play disables communication and impedes the progress of the game.

Moreover, while an example where a game component is fixed to a fixing unit by fitting is described in the present embodiment, other fixing methods may be adopted instead. For example, a method such as clamping with a clip or the like, gripping by friction, and engaging with a projection may be adopted.

As described earlier, in the present embodiment, due to the communication control unit 18 controlling the switching unit 20 and the extension switching unit 33, an antenna from which a signal is sent to the communication control unit 18 (an active antenna) is switched among the base antenna 19, the first extension antenna 31, and the second extension antenna 32. More specifically, the communication control unit 18 controls the switching unit 20 so that the signal sent to the communication control unit 18 is switched between a signal from the base antenna 19 and a signal from the extension antenna device 3 for each prescribed time and, further, controls the extension switching unit 33 at a time assigned to the extension antenna device 3 to switch between the first extension antenna 31 and the second extension antenna 32.

In this case, from which antenna the input of a signal as data has been made can be discerned based on a time block (time slot) in which the signal had been input. For example, when there are three sequentially repeated time blocks 1 to 3, the communication control unit 18 controls the switching unit 20 so that the base antenna 19 becomes active in the time block 1 and the extension antenna device 3 becomes active in the time blocks 2 and 3. Furthermore, the communication control unit 18 controls the extension switching unit 33 so that the first extension antenna 31 becomes active in the time block 2 and the second extension antenna 32 becomes active in the time block 3. Accordingly, the communication control unit 18 can cause the base antenna 19 to become active in the time block 1, the first extension antenna 31 to become active in the time block 2, and the second extension antenna 32 to become active in the time block 3.

Second Embodiment

While the information processing device 1 is a device in which various components are provided in a single housing in the first embodiment described above, information processing devices to which the present disclosure is applicable are not limited to information processing devices with a single housing. An information processing device may be configured so that components thereof are distributed among a plurality of housings. In addition, a part of or all of the functions thereof may be executed by a device installed at a remote location or by a plurality of devices installed in a distributed manner using cloud technology or the like.

Figure 2:
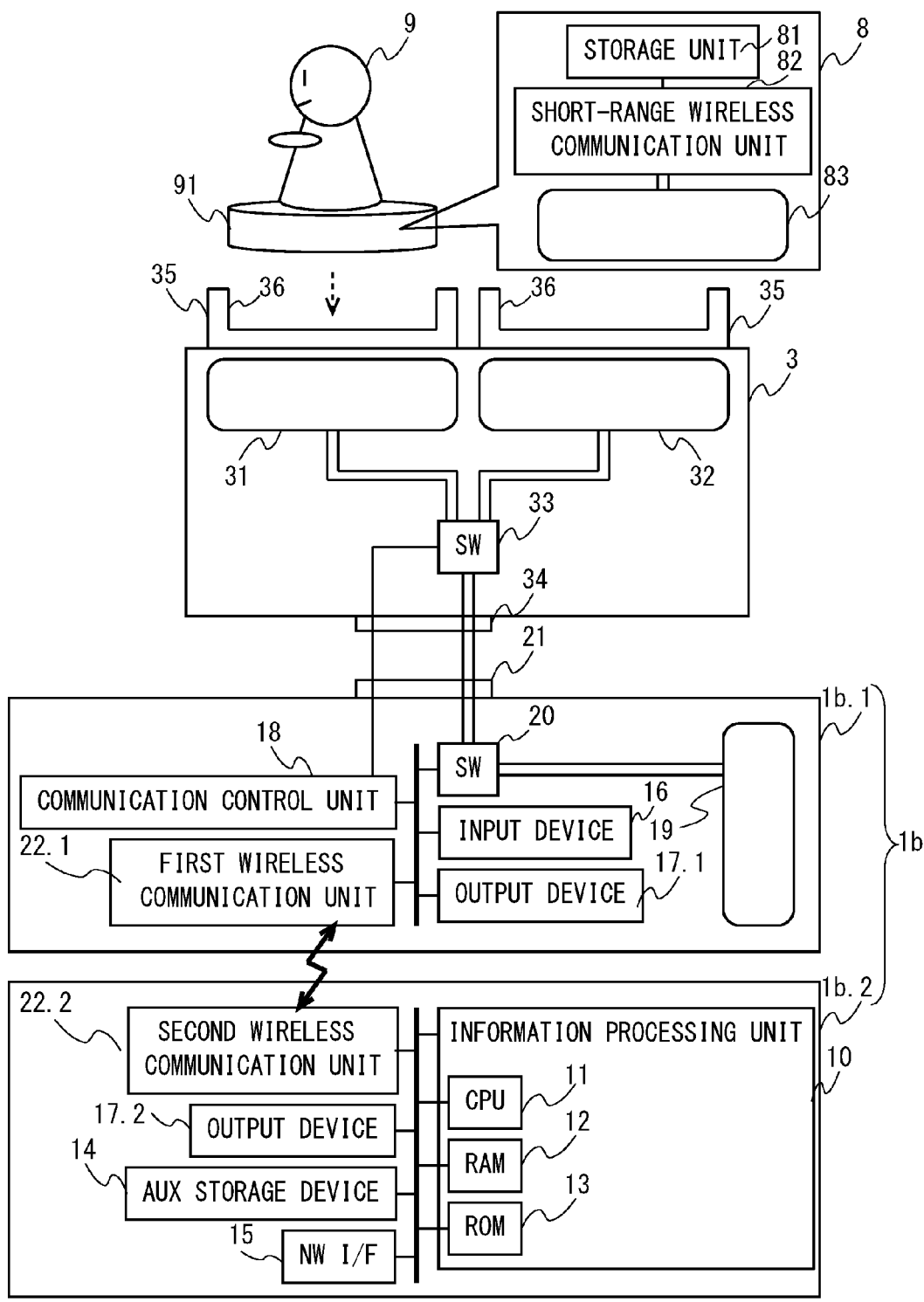
FIG. 2 is a diagram showing an outline of a configuration and an outline of a hardware configuration of an information processing system according to a second embodiment.

FIG. 2 is a diagram showing an outline of a configuration and an outline of a hardware configuration of an information processing system according to a second embodiment. Components similar to those described in the first embodiment will be denoted by same reference characters and a description thereof will be omitted.

With the information processing system according to the present embodiment, an information processing device 1b differs from the information processing device 1 described in the first embodiment in that the information processing device 1b has two housings (a first housing 1b.1 and a second housing 1b.2) which are interconnected in a wireless or wired manner and which cooperate with each other to function as one information processing device 1b. Specifically, the first housing 1b.1 is a controller to be grasped by a user and which includes the input device 16, an output device 17.1 that is a display or the like, the communication control unit 18, the base antenna 19, the switching unit (switch IC) 20, and the information processing device-side terminal 21. By configuring a controller in this manner, the user can play while grasping the controller to which the game component 9 is attached.

In addition, the second housing 1b.2 is a stationary information processing unit main body which includes the information processing unit 10 (including the CPU 11, the RAM 12, and the ROM 13), the auxiliary storage device 14, the network interface 15, and an output device 17.2 for performing output to a television device or the like. Moreover, while an example in which output devices are respectively provided in the first housing 1b.1 and the second housing 1b.2 is described in the present embodiment, an output device may only be provided in one of the housings.

Furthermore, the first housing 1b.1 includes a first wireless communication unit 22.1 and the second housing 1b.2 includes a second wireless communication unit 22.2. However, while an example in which the first housing 1b.1 and the second housing 1b.2 cooperate with each other via wireless communication is described in the present embodiment, as described earlier, the housings may cooperate with each other via a wired connection instead.

The first wireless communication unit 22.1 provided in the first housing transmits contents of a user operation received by the input device 16 and contents of short-range wireless communication received by the communication control unit 18 to the information processing unit 10 via wireless communication with the second wireless communication unit 22.2. The information processing unit performs information processing (game processing) in accordance with the received contents of short-range wireless communication and contents of the user operation.

The second wireless communication unit 22.2 provided in the second housing receives data transmitted by the first wireless communication unit and sends the data to the information processing unit 10. Furthermore, the second wireless communication unit 22.2 sends instructions from the information processing unit 10 to the communication control unit 18 and the output device 17.1 via wireless communication with the first wireless communication unit 22.1.

In other words, the present disclosure is applicable to information processing devices having various modes and enables an antenna configuration conforming to characteristics of information processing to be readily provided regardless of the type of the information processing device.

Third Embodiment

In the first embodiment described earlier, while the extension antenna device 3 includes the extension switching unit 33 and switches between the extension antennas 31 and 32 under the control of the communication control unit 18 of the information processing device 1, the extension switching unit (switch IC) of the extension antenna device can be omitted. Switching between the plurality of extension antennas 31 and 32 provided in an extension antenna device 3c can be performed by being connected to a switching unit 20c of an information processing device 1c.

Figure 3:
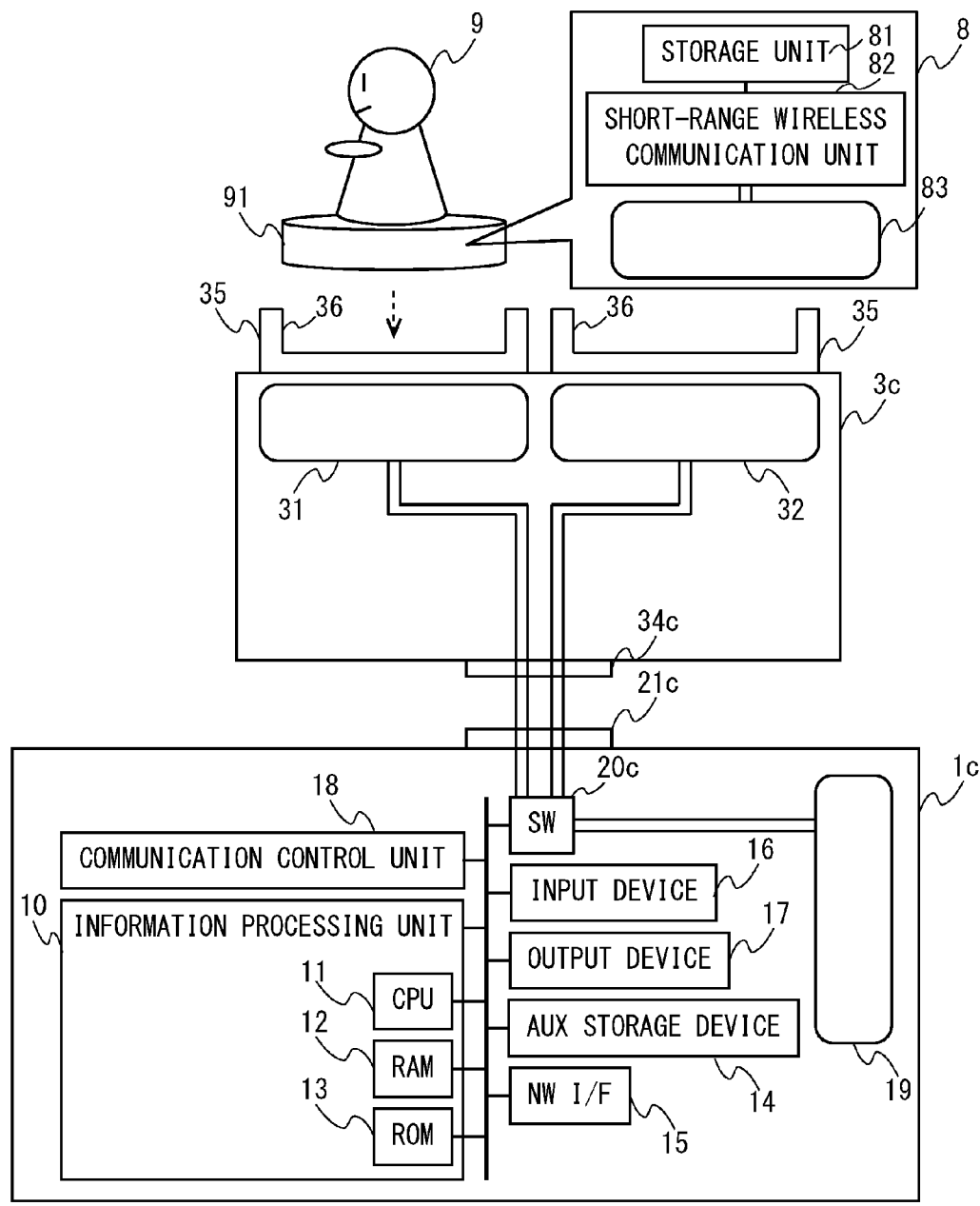
FIG. 3 is a diagram showing an outline of a configuration and an outline of a hardware configuration of an information processing system according to a third embodiment.

FIG. 3 is a diagram showing an outline of a configuration and an outline of a hardware configuration of an information processing system according to a third embodiment. Components similar to those described in the first embodiment will be denoted by same reference characters and a description thereof will be omitted.

In the information processing system according to the present embodiment, the extension antenna device 3c includes the first extension antenna 31, the second extension antenna 32, an extension antenna-side terminal 34c, and the fixing unit 35 but does not include an extension switching unit (a switch IC) used for switching between extension antennas. Therefore, a signal line for controlling the extension switching unit 33 which is present in the extension antenna-side terminal 34 according to the first embodiment is not housed in the extension antenna-side terminal 34c and, in place thereof, a signal line for the first extension antenna 31 and a signal line for the second extension antenna 32 are housed therein.

A similar description applies to the side of the information processing device 1c, and an information processing device-side terminal 21c houses a signal line for the first extension antenna 31 and a signal line for the second extension antenna 32 in place of a signal line for controlling the extension switching unit 33.

The switching unit 20c is capable of switching a signal sent to the communication control unit 18 among a signal from the base antenna 19, a signal from the first extension antenna 31, and a signal from the second extension antenna 32. In addition, by controlling the switching unit 20c, the communication control unit 18 switches a signal sent to the communication control unit 18 among a signal from the base antenna 19, a signal from the first extension antenna 31, and a signal from the second extension antenna 32.

In other words, with the information processing system according to the present embodiment, the extension switching unit (the switch IC) on the side of the extension antenna device can be omitted and an antenna configuration conforming to characteristics of information processing can be readily provided at a lower cost than the first embodiment. In addition, while the communication control unit 18 must control the switching unit 20 and the extension switching unit 33 so as to cooperate with each other when switching active antennas in the first and second embodiments, in the present embodiment, the communication control unit 18 can switch active antennas by only controlling the switching unit 20c.

Advantageous Effects

According to the embodiments described above, an antenna configuration conforming to characteristics of information processing can be readily provided for each information processing task in which short-range wireless communication is used. In particular, with the extension antenna device according to the present embodiment described above, since an IC for performing short-range wireless communication (corresponding to the communication control unit provided in the information processing device 1) need not be provided on the side of the extension antenna device, advantages are gained in manufacturing cost and availability.

What is claimed is:
1. An information processing system comprising an information processing device and an extension antenna device connected to the information processing device, wherein
the information processing device comprises:

a communication control unit which performs short-range wireless communication with a communicator having a short-range wireless communication function;

a base antenna which is used for the short-range wireless communication; and an information processing device-side terminal which is configured to be connected with the extension antenna device, the extension antenna device comprises:

an extension antenna which is used for the short-range wireless communication; and an extension antenna-side terminal which, by being connected to the information processing device-side terminal, connects the extension antenna and the information processing device to each other, the communication control unit performs the short-range wireless communication with the communicator via at least one of the base antenna and the extension antenna, the information processing device further comprises a switching unit configured to switch a signal to be sent to the communication control unit between a signal from the base antenna and a signal from the extension antenna, the communication control unit controls switching of antennas by the switching unit; and the communication control unit controls the switching unit so that a signal to be sent to the communication control unit is switched between a signal from the base antenna and a signal from the extension antenna for each prescribed time, and determines from which antenna the input of the signal as data has been made, based on a time block in which the signal has been input.

2. The information processing system according to claim 1, wherein the information processing device further comprises an input device which receives an operation by a user.

3. The information processing system according to claim 2, wherein the communication control unit determines which antenna is to be used to acquire data in accordance with contents of an operation received by the input device.

4. The information processing system according to claim 2, wherein the information processing device further comprises an information processing unit which performs information processing in accordance with contents of the short-range wireless communication received from the communicator by the communication control unit and with contents of an operation received by the input device.

5. The information processing system according to claim 1, wherein the information processing device further comprises:

a first housing in which the communication control unit is provided;

a second housing in which the information processing unit is provided;

a first wireless communication unit which is provided in the first housing and which transmits contents of the short-range wireless communication received by the communication control unit to the information processing unit by wireless communication;

a second wireless communication unit which is provided in the second housing and which receives the contents transmitted by the first wireless communication unit; and an information processing unit which is provided in the second housing and which performs information processing in accordance with contents of the short-range wireless communication received from the communicator by the communication control unit.

6. The information processing system according to claim 5, wherein the information processing device further comprises an input device which is provided in the first housing and which receives an operation by a user, the first wireless communication unit further transmits contents of an operation received by the input device to the information processing unit by wireless communication, and the information processing unit performs information processing in accordance with contents of the short-range wireless communication received from the communicator by the communication control unit and with contents of an operation received by the input device.

7. The information processing system according to claim 1, wherein the extension antenna device comprises a first extension antenna and a second extension antenna.

8. The information processing system according to claim 7, wherein the extension antenna device further comprises an extension switching unit configured to switch a signal to be sent to the communication control unit between a signal from the first extension antenna and a signal from the second extension antenna, and the communication control unit controls the switching unit and the extension switching unit to switch a signal to be sent to the communication control unit among a signal from the base antenna, a signal from the first extension antenna, and a signal from the second extension antenna.

9. The information processing system according to claim 7, wherein the extension antenna-side terminal and the information processing device-side terminal include a signal line for the first extension antenna and a signal line for the second extension antenna, the switching unit is configured to switch a signal to be sent to the communication control unit among a signal from the base antenna, a signal from the first extension antenna, and a signal from the second extension antenna, and the communication control unit controls the switching unit to switch a signal to be sent to the communication control unit among a signal from the base antenna, a signal from the first extension antenna, and a signal from the second extension antenna.

10. The information processing system according to claim 1, wherein the extension antenna device differs in size from the base antenna.

11. The information processing system according to claim 1, wherein the communicator includes a storage unit in which data is recorded and a short-range wireless communication unit which reads the data from the storage unit and transmits the data, and contents of the short-range wireless communication received from the communicator by the communication control unit include the data.

12. The information processing system according to claim 1, wherein
the extension antenna device further comprises a fixing unit which fixes the communicator in a range of the short-range wireless communication using the extension antenna.

13. An information processing system comprising an information processing device and an extension antenna device connected to the information processing device, wherein
the information processing device comprises:
a communication control unit which performs short-range wireless communication with a communicator having a short-range wireless communication function;
a base antenna which is used for the short-range wireless communication; and
an information processing device-side terminal which is configured to be connected with the extension antenna device,
the extension antenna device comprises:
an extension antenna which is used for the short-range wireless communication; and
an extension antenna-side terminal which, by being connected to the information processing device-side terminal, connects the extension antenna and the information processing device to each other, and
the communication control unit performs the short-range wireless communication with the communicator via at least one of the base antenna and the extension antenna;
the extension antenna device further comprises a fixing unit which fixes the communicator in a range of the short-range wireless communication using the extension antenna;
the communicator has a member having a prescribed shape and size, and
the fixing unit includes a fitting section to which the member fits.

14. An information processing device, comprising:
a communication control unit which performs short-range wireless communication with a communicator having a short-range wireless communication function;
a base antenna which is used for the short-range wireless communication; and
a terminal which is configured to be connected with an extension antenna device comprising an extension antenna used for the short-range wireless communication, wherein
the communication control unit performs the short-range wireless communication with the communicator via at least one of the base antenna and the extension antenna;
the information processing device further comprises a switching unit configured to switch a signal to be sent to the communication control unit between a signal from the base antenna and a signal from the extension antenna;
the communication control unit controls switching of antennas by the switching unit; and
the communication control unit controls the switching unit so that a signal to be sent to the communication control unit is switched between a signal from the base antenna and a signal from the extension antenna for each prescribed time, and determines from which antenna the input of the signal as data has been made, based on a time block in which the signal has been input.

15. A method executed by a computer comprising a base antenna used for short-range wireless communication and a terminal, which is configured to be connected with an extension antenna device comprising an extension antenna used for the short-range wireless communication, the method comprising:
performing the short-range wireless communication with a communicator having a short-range wireless communication function via at least one of the base antenna and the extension antenna; and
switching, using switching circuitry, a signal, which is sent to be processed in the performing the short-range wireless communication, between a signal from the base antenna and a single from the extension antenna;
controlling switching of antennas by the switching circuitry; and
controlling the switching circuitry so that the signal which is sent to be processed in the performing of the short-range wireless communication is switched between the signal from the base antenna and the signal from the extension antenna for each prescribed time, and
determining from which antenna the input of the signal as data has been made, based on a time block in which the signal has been input.

* * * * *